No. 787,402. PATENTED APR. 18, 1905.
J. E. RUDOLPH.
SUCTION ROLL FOR PAPER MAKING MACHINES.
APPLICATION FILED DEC. 24, 1903.
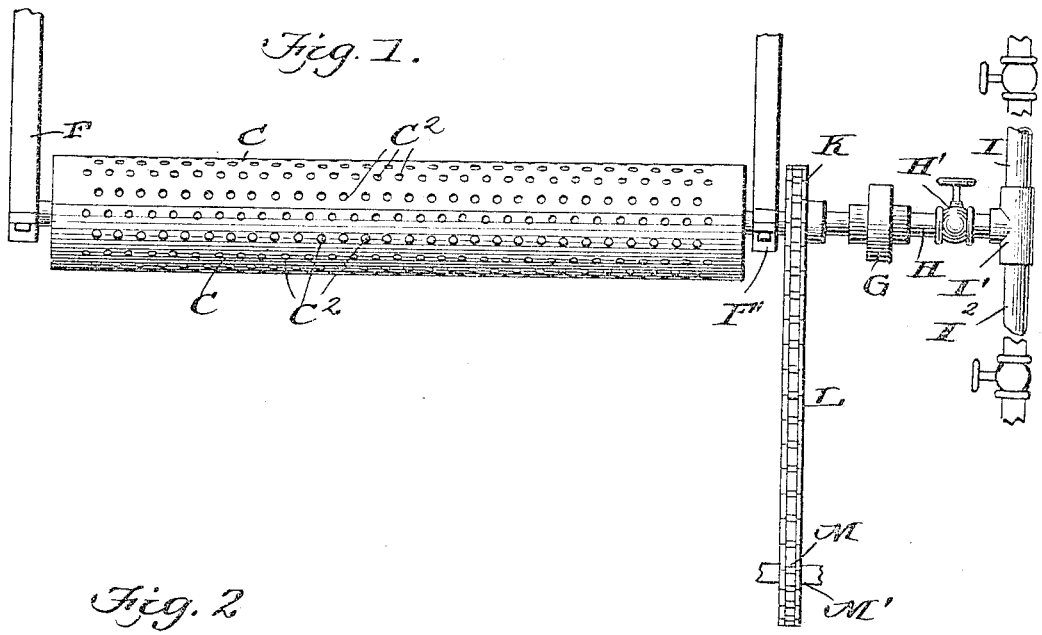
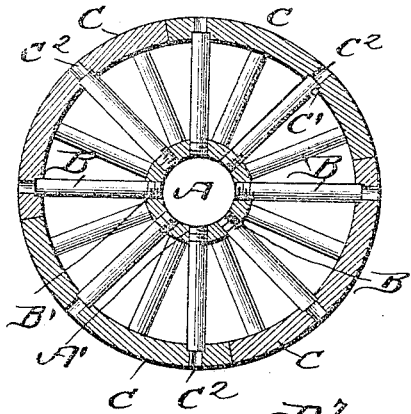
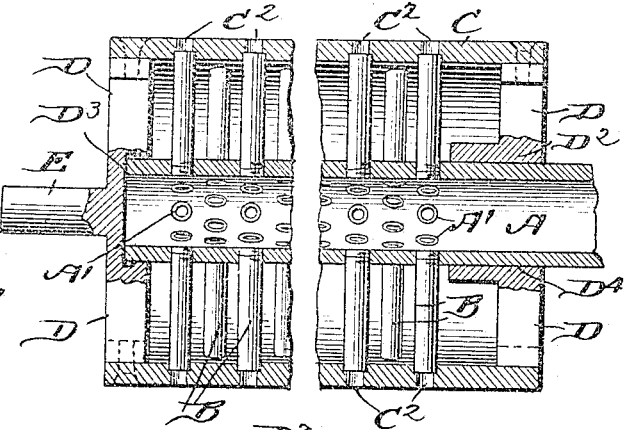
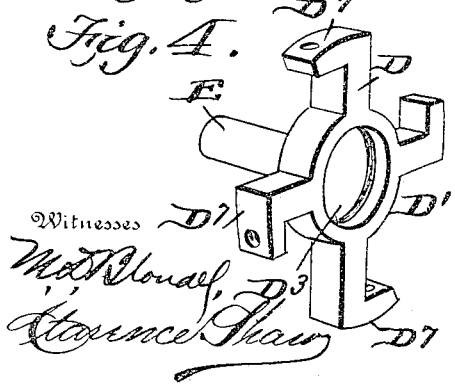
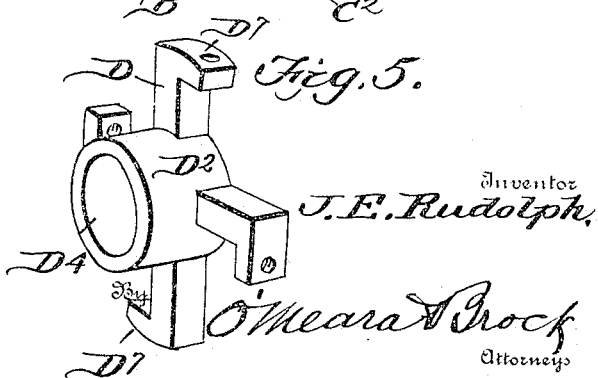
Inventor
J. E. Rudolph,
O'Meara & Brock
Attorneys No. 787,402.

Patented April 18, 1905.

UNITED STATES PATENT OFFICE.

JOSEPH ERVIN RUDOLPH, OF UPPER DARBY, PENNSYLVANIA.

SUCTION-ROLL FOR PAPER-MAKING MACHINES.

SPECIFICATION forming part of Letters Patent No. 787,402, dated April 18, 1905.

Application filed December 24, 1903. Serial No. 186,424.

*To all whom it may concern:*

Be it known that I, JOSEPH ERVIN RUDOLPH, a citizen of the United States, residing at Upper Darby, in the county of Delaware and State of Pennsylvania, have invented a new and useful Improvement in Suction-Rolls for Paper-Making Machines, of which the following is a specification.

This invention is an improved construction of revolving suction-roll for paper-making machines, the object being to provide a simple and durable as well as efficient construction of suction-roll; and with this object in view the invention consists in the novel features of construction, combination, and arrangement, all of which will be fully described hereinafter, and pointed out in the claim.

In the drawings forming part of this specification, Figure 1 is a side view of a suction-roll constructed in accordance with my invention. Fig. 2 is a transverse sectional view of the same. Fig. 3 is a longitudinal sectional view, the roll being broken away at the center to show both ends of the same. Fig. 4 is a detail perspective view of the spider at one end of the roll. Fig. 5 is a detail perspective view of the spider at the opposite end of the roll.

In carrying out my invention I employ a pipe A, which may be of any suitable material and any size desired, according to the nature of the work to be done. This pipe has a series of threaded apertures A', into which are screwed the threaded ends B' of the pipes B, said pipes extending radially from the main pipe A, the outer ends of said pipes fitting into countersunk recesses C', produced in the inner sides of the shell C, said shell having a series of openings $C^2$, which communicate with or register with the pipes B. The shell C may be made of any suitable material and constructed in sections, there being four sections shown in the drawings; but it will be understood that the shell can be made in two sections, if so desired. The sections of the shell are connected to the arms D of the spiders D' and $D^2$, said arms being annular in shape and the outer face curved in the arc of a circle, as shown at $D^3$, in order that the shell may fit snugly thereon. The spider D' has a socket $D^3$, into which the end of the pipe A fits, and upon the opposite side the spider is formed with a journal E, which rests in a suitable bearing F, by means of which that end of the roll is supported. The spider $D^2$ is formed with a tubular central portion $D^4$, through which the pipe A passes, the end of said pipe being fitted into a union G, which also has a suction-pipe H connected thereto, a valve H' being arranged in the suction-pipe to regulate the suction.

I indicates a pipe which leads from a steam-boiler (not shown) and connects to a T-coupling I', to which the suction-pipe is also connected. A discharge-pipe $I^2$ is also connected to this coupling, and the pipe passing from the boiler passes on out through this discharge-pipe and in this manner creates a suction through the radial pipes B and longitudinal pipe A. A second bearing F' is also employed for supporting the other end of the roll, and mounted upon the pipe adjacent said bearing is a sprocket K, over which passes a sprocket-chain L, driven by a sprocket-wheel M, mounted upon a shaft M' and driven from any suitable source, the size of the sprockets being determined by the nature of the work to be performed. Thus it will be seen that the shell can be rotated simultaneously with the creation of the suction therethrough. It is also obvious that by constructing the roll in the manner herein shown and described a uniform suction will be maintained from the surface thereof toward the interior, and this suction can be regulated by the valve H'.

In practical use the cylinder C is partially immersed in a suitable water-box, which excludes air from the apertures $C^2$, not closed by the paper.

Having thus fully described my invention, what I claim as new, and desire to secure by Letters Patent, is—

A suction-roll comprising a longitudinal pipe having a series of threaded apertures, a shell surrounding the longitudinal pipe and having a series of non-threaded apertures, the inner ends of which are formed with countersunk recesses, the radial pipes threaded at their inner ends and fitted in the threaded apertures in the horizontal pipe, the outer ends of said radial pipes fitting in the countersunk recesses in the shell, said shell being made in sections, the spiders at the ends of the shell, one spider being constructed with a socket into which the end of the longitudinal pipe fits, and a journal for supporting the roll, the other spider having tubular central portion through which the longitudinal pipe passes, the sprocket-wheel mounted upon said pipe, the sprocket-chain for rotating the wheel, the suction-pipe having a valve, and the swivel-joint connecting the suction and longitudinal pipes, and the steam supply and discharge pipes connected with the suction-pipe, for the purpose set forth.

JOSEPH ERVIN RUDOLPH.

Witnesses:
BENJAMIN ERVIN RUDOLPH,
MARGARET A. RUDOLPH.